Figure 1:
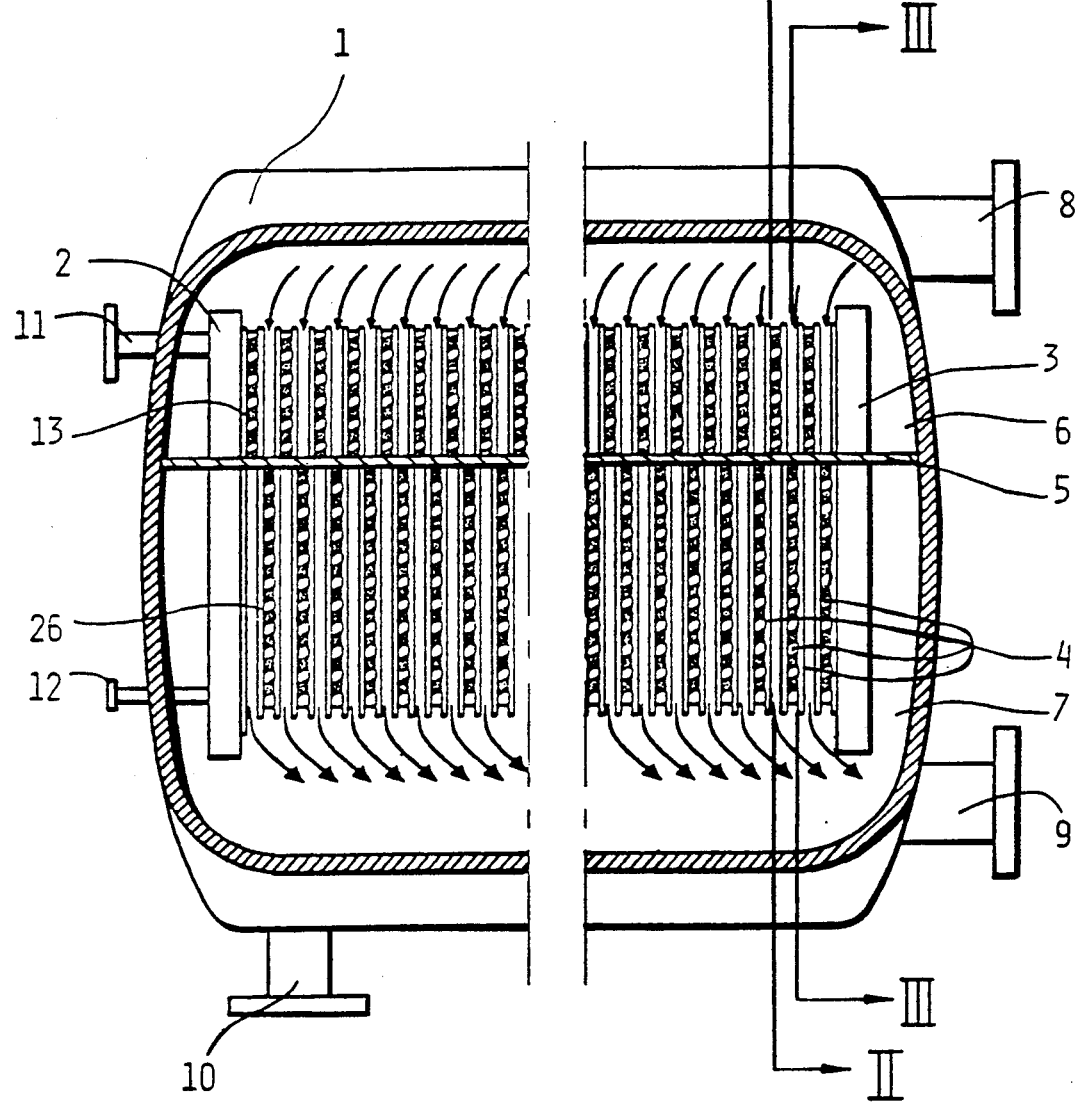

United States Patent [19]

Blomgren et al.

[11] Patent Number: 5,203,406
[45] Date of Patent: Apr. 20, 1993

[54] PLATE EVAPORATOR

[75] Inventors: Ralf Blomgren, Skanör, Sweden; Niels-Erik Clausen, Stenlöse, Denmark

[73] Assignee: Alfa-Laval Desalt A/S, Hvidovre, Denmark

[21] Appl. No.: 849,054

[22] PCT Filed: Oct. 30, 1990

[86] PCT No.: PCT/SE90/00703
  § 371 Date: May 1, 1992
  § 102(e) Date: May 1, 1992

[87] PCT Pub. No.: WO91/06818
  PCT Pub. Date: May 16, 1991

[30] Foreign Application Priority Data

Nov. 2, 1989 [SE] Sweden .................. 8903671

[51] Int. Cl.$^5$ .................. F28F 3/10; B01D 1/22
[52] U.S. Cl. .................. 165/167; 159/28.6; 202/236
[58] Field of Search .................. 165/167; 202/235, 236; 159/13.1, 28.6

[56] References Cited

U.S. PATENT DOCUMENTS

| | | | |
|---|---|---|---|
| 3,735,793 | 5/1973 | Burberry et al. | 165/167 |
| 4,260,013 | 4/1981 | Sumitomo | 165/167 |
| 4,373,579 | 2/1983 | Jernqvist et al. | 165/167 |
| 4,978,429 | 12/1990 | Sears et al. | 159/28.6 |

FOREIGN PATENT DOCUMENTS

| | | | |
|---|---|---|---|
| 11470 | 4/1973 | Japan | 165/167 |
| 39974 | 4/1978 | Japan | 165/167 |
| 43082 | 4/1978 | Japan | 165/167 |
| 1299481 | 12/1972 | United Kingdom . | |
| 1412414 | 11/1975 | United Kingdom . | |
| 1421915 | 1/1976 | United Kingdom . | |
| 1425176 | 2/1976 | United Kingdom . | |

Primary Examiner—John Rivell
Assistant Examiner—L. R. Leo
Attorney, Agent, or Firm—Davis Hoxie Faithfull & Hapgood

[57] ABSTRACT

In a plate evaporator of the falling film type, every second plate interspace constitutes an evaporation space (28) in which evaporation liquid is distributed across the width of the plates in order to run downwardly on the plates, whereas the rest of the plate interspaces constitute condensation spaces (30) for a heat emitting vapor. The invention concerns a particular arrangement for supplying evaporation liquid to the evaporation spaces (28). According to this arrangement, a distribution chamber (27) is delimited within the uppermost part of each plate interspace constituting an evaporation space (28). This distribution chamber extends across the whole width of the plates and communicates with an inlet channel for liquid, extending through the plate package and formed by aligned openings (16) in the plates. In the upper part of each condensation space (30), several sealing means (25) are arranged horizontally spaced from each other. Each sealing means (25) forms together with the two adjacent plates a transferring chamber (29) that is closed from the condensation space (30), but through small holes (17, 18) in the plates communicates with at least one distribution chamber (27) and one evaporation space (28). Heat emitting vapor may flow into each condensation space (30) from above through the gaps formed between the horizontally spaced sealing means (25).

5 Claims, 4 Drawing Sheets

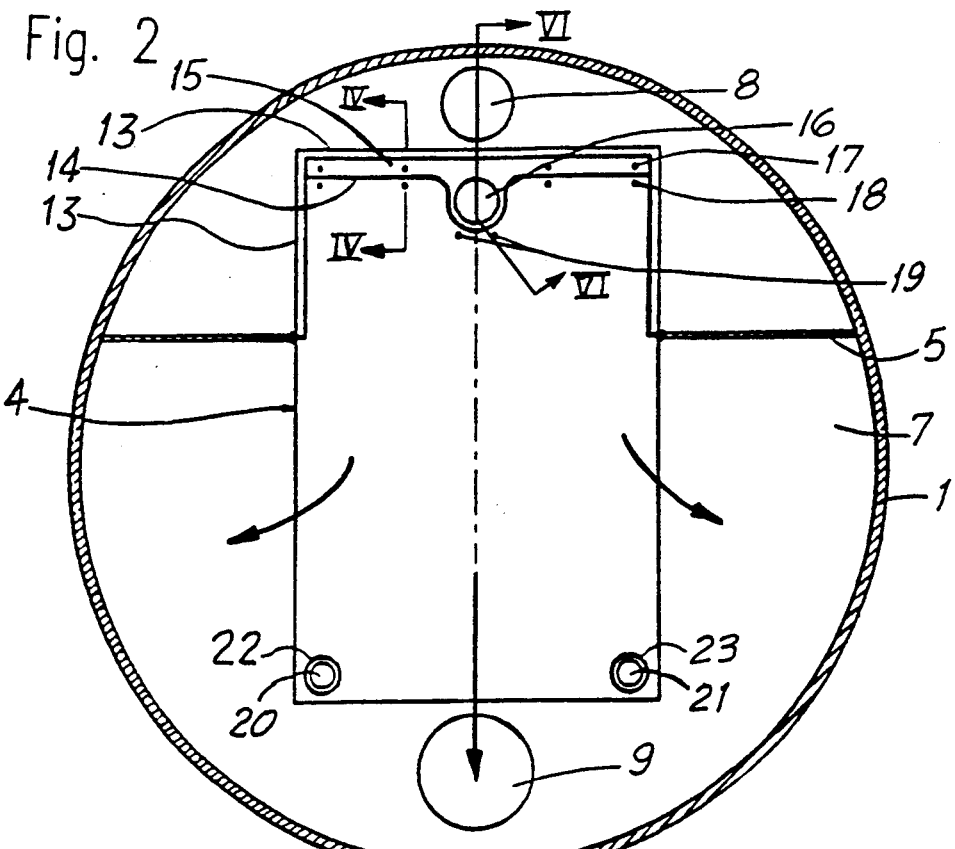
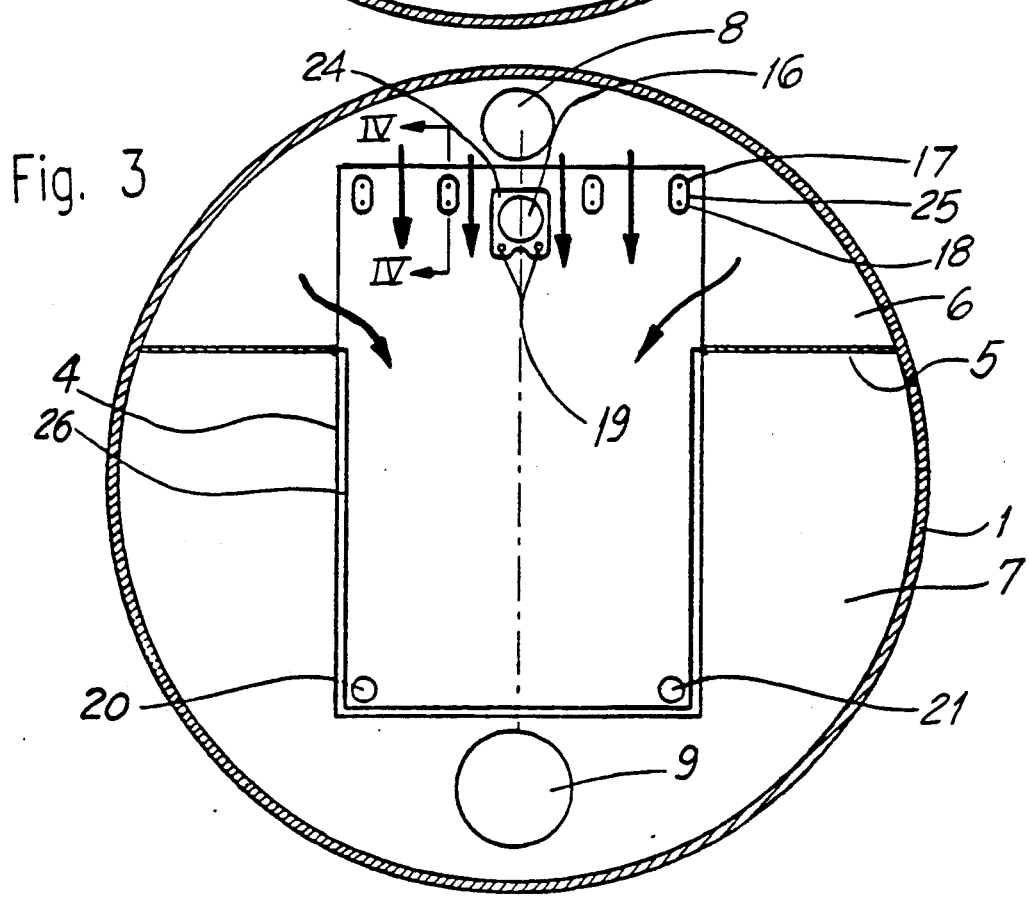

PLATE EVAPORATOR

The present invention concerns a plate evaporator of the kind comprising a package of substantially vertically arranged heat transferring plates with plate interspaces, every second one of which forms an evaporation space for at least partial evaporation of a liquid and the rest of the plate interspaces forming condensation spaces for at least partial condensation of a heat emitting vapour, and further comprising sealing means which in the upper parts of those plate interspaces forming evaporation spaces delimit distribution chambers, each of which has several separate connections with at least one evaporation space, the heat transferring plates having through openings forming together an inlet channel for evaporation liquid, which extends through the plate package and communicates with the distribution chambers.

GB 1.299.481 shows a plate evaporator of this kind, in which heat emitting vapour is transported to the different condensation spaces in the plate package in the same manner as evaporation liquid is transported to the evaporation spaces, i.e. through a channel formed by aligned openings in the heat transferring plates.

Transportation of heat emitting vapour in this manner through a channel extending through the package of heat transferring plates has several disadvantages. One is that the openings in the heat transferring plates have to be very large for avoiding unnecessary pressure drop of the supplied vapour, which means that much plate material has to be removed from the heat transferring plates. Another disadvantage is that the area of the vapour inlet to each plate interspace forming a condensation space becomes relatively small, which creates an undesired pressure drop of the supplied vapour. A third disadvantage is that the pressure conditions at the vapour inlets to the various condensation spaces in the plate package will become different along the inlet channel through the plate package. This results in different temperatures prevailing in the various condensation spaces, and all of these, therefore, can not be used with the same efficiency.

All of these disadvantages may be avoided if the heat emitting vapour is instead introduced into the condensation spaces directly from the surroundings of the plate package through the slots formed between the edge portions of the heat transferring plates.

GB 1.568.733 shows a plate condenser in which the vapour to be condensed is introduced into every second plate interspace through the slots formed between the edge portions of the plates. In this case the other plate interspaces form no evaporation spaces but closed passages for a cooling liquid. The passages are, thus, closed from the surroundings of the plate package by means of gaskets extending along the edges of the plates around the whole periphery thereof.

A main object of the present invention is to provide a plate evaporator of the initially described kind, in which liquid to be evaporated may be distributed effectively to the various evaporation spaces in the plate package as well as within each evaporation space across the whole width of the heat transferring plates and—simultaneously—the means necessary for obtainment of such a liquid distribution does not prevent heat emitting vapour from flowing into the condensation spaces from above through the slots formed between the upper edges of the heat transferring plates.

An object of the invention is also to provide a liquid distribution arrangement that makes it simple and inexpensive to produce plate evaporators of the kind here in question and that makes possible a safe operation and a simple maintenace service of this kind of plate evaporators.

These objects may be obtained in a plate evaporator of the initially defined kind, which is characterized in that at least two sealing means are arranged in the upper part of each condensation space, horizontally spaced from each other seen along the heat transferring plates, each of said sealing means delimiting between the heat transferring plates a transferring chamber which is closed from connection with other parts of the condensation space, that the condensation spaces communicate with the surrounding of the plate package through the gaps formed between said sealing means for receiving heat emitting vapour from above, and that the heat transferring plates have through holes communicating with the transferring chambers, for each transferring chamber at least one first hole connecting the transferring chamber with a distribution chamber and at least one second hole connecting the transferring chamber with one evaporation space.

It is possible to obtain the above defined objects of the invention if each transferring chamber between two heat transferring plates communicates with a distribution chamber through a hole in one of the heat transferring plates and with an evaporation space through a hole in the other heat transferring plate. However, according to a preferred embodiment of the invention at least every second heat transferring plate has through holes arranged in pairs, one hole in a pair of holes connecting a transferring chamber with a distribution chamber and the other hole connecting the same transferring chamber with an evaporation space.

If desired, each transferring chamber may communicate with two different distribution chambers and one or two different evaporation spaces, or with only one distribution chamber and two different evaporation spaces.

For distribution of liquid to be evaporated across the width of the heat transferring plates in each evaporation space the distribution chamber in every second evaporation plate interspace may—if considered suitable—extend across only one half of the width of the heat transferring plates, whereas the distribution chambers in the rest of the evaporation plate interspaces extend across the other half of the heat transferring plate width. However, preferably each of the distribution chambers extends horizontally across the whole width of the heat transferring plates, i.e. between the vertical edge portions of the heat transferring plates, the previously mentioned inlet channel for evaporation liquid extending through the plate package substantially in the middle between the vertical edge portions.

For obtainment of the smallest possible pressure drop in connection with the flow of the heat emitting vapour into the condensation spaces the latter preferably communicate with the surrounding of the plate package along the vertical edges as well as along the upper horizontal edges of the heat transferring plates.

Figure 4:
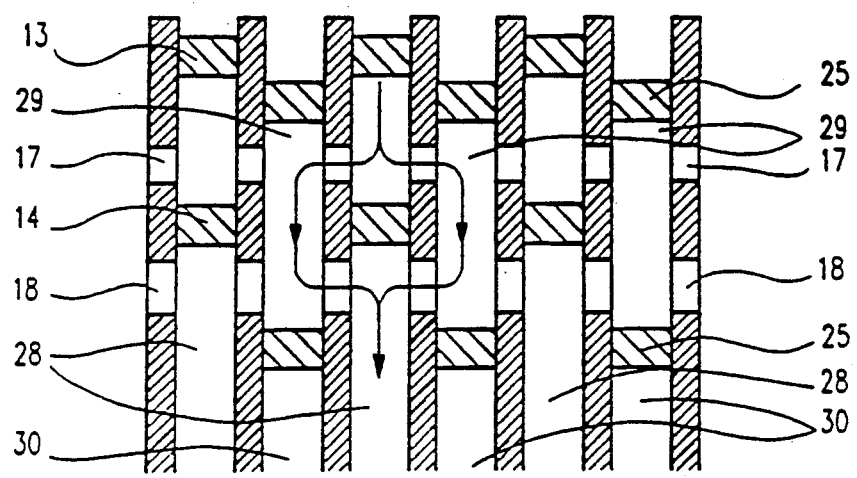
Figure 5:
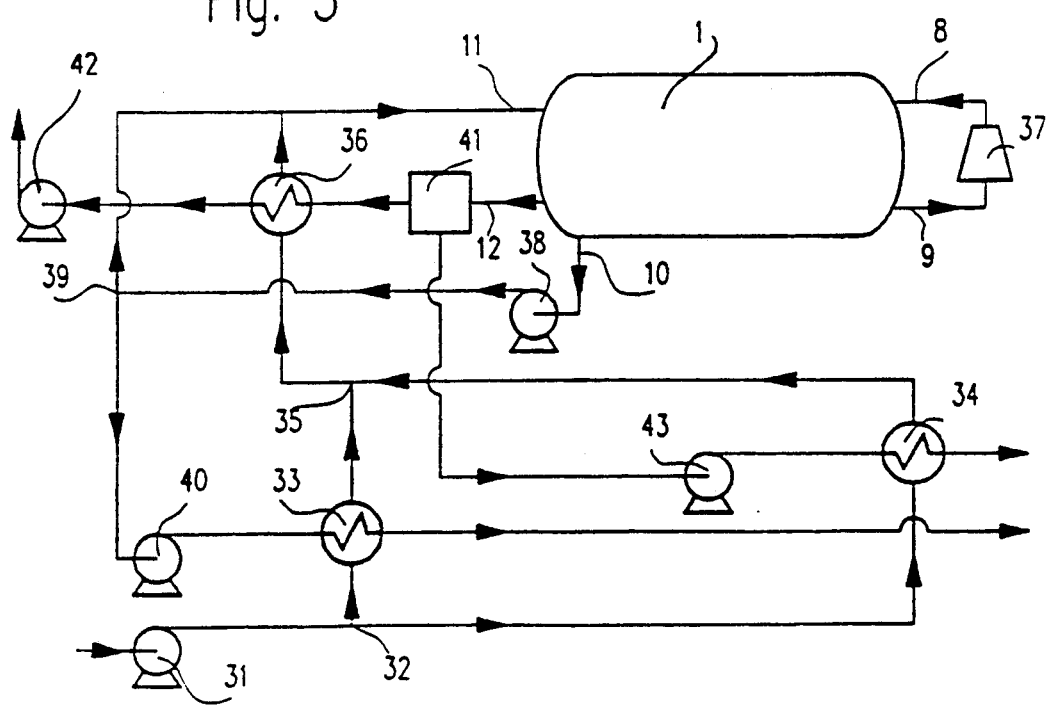

The invention is described below with reference to the accompanying drawing, in which FIG. 1 shows a container and a plate heat exchanger arranged therein, FIG. 2 shows a cross-sectional view along the line II—II in FIG. 1, FIG. 3 shows a cross-sectional view along the line III—III in FIG. 1, FIG. 4 shows a section through the upper part of a plate heat exchanger according to FIG. 1, which section is taken along a line IV—IV in FIG. 2 and a corresponding line IV—IV in FIG. 3, and FIG. 5 shows a flow diagram of a plant for production of fresh water from sea water.

Figure 6:
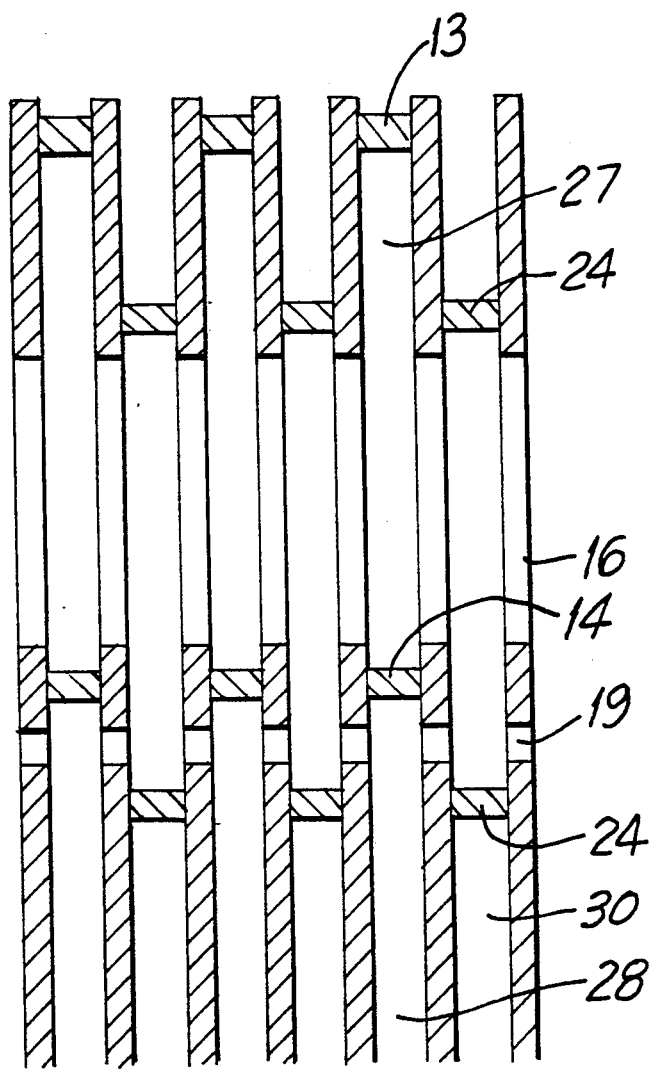

FIG. 6 is a view along the section line VI—VI in FIG. 2.

FIG. 1 shows a closed container 1 in the form of a cylindrical pressure vessel provided with end walls and a plate heat exchanger arranged within the container. The plate heat exchanger comprises two end plates 2 and 3 and a package of heat transferring plates 4 which are clamped conventionally between the end plates. The end plates 2, 3 as well as the heat transferring plates 4 are carried within the container by a frame which is not shown in the drawing, so that they extend vertically. Spacing members, preferably pressed in the heat transferring plates in a conventional manner, keep the heat transferring plates at a distance from each other, so that plate interspaces to be flowed through by heat exchange fluids are formed.

A horizontal partition 5 extends within the container 1 all the way around the plate heat exchanger, so that it divides the interior of the container in an upper chamber 6 and a lower chamber 7. The upper chamber 6 has an inlet 8 for heat emitting vapour and the lower chamber 7 has an outlet 9 for vapour having been generated in the plate heat exchanger. At its bottom the container 1 has a further outlet 10 from the lower chamber 7, which is intended for liquid having been supplied to but not been evaporated in the plate heat exchanger.

Through one end wall of the container there are extending one pipe 11 and two pipes 12, said pipe 11 forming an inlet to the plate heat exchanger for liquid to be evaporated therein, and the pipes 12 forming outlets for condensate formed in the plate heat exchanger.

Between the heat transferring plates 4 there are arranged sealing members of different kinds. These are described below with reference to FIGS. 2 and 3.

FIG. 2 shows one side of a heat transferring plate 4. As can be seen the heat transferring plate has an elongated rectangular form and is arranged in the container 1 such that its long sides extend vertically and its short sides extend horizontally. The partition 5 extends at a certain level in the container 1 from each of the long sides of the heat transferring plates 4 horizontally towards the surrounding wall of the container 1.

On its side shown in FIG. 2 the heat transferring plate 4 has a first gasket 13 extending along the edge of the heat transferring plate upwardly from the level of the partition 5 at one long side of the plate, then along the upper short side of the plate and back downwardly along the other long side of the plate to the level of the partition 5. As can be seen from FIG. 2, the gasket 13 extends at the long sides of the heat transferring plate horizontally up to the respective parts of the partition 5.

A second gasket 14 extends in parallel with the upper short side of the heat transferring plate between the vertical portions of the gasket 13, so that an area 15 of the upper part of the heat transferring plate is completely surrounded by the gaskets 13 and 14. When the gaskets 13 and 14 abut against the plate shown in FIG. 2 as well as an adjacent plate in the plate heat exchanger, a closed so called distribution chamber will be formed in the plate interspace in the area 15, which extends across the whole width of the heat transferring plates.

In the area 15 the heat transferring plate 4-like all of the heat transferring plates in the plate heat exchanger- has a through opening 16. All of the openings 16 form an inlet channel through the package of heat transferring plates 4, communicating both with the previously mentioned inlet 11 (FIG. 1) for liquid to be evaporated and with each of said distribution chambers.

In addition to the opening 16 each heat transferring plate has in the area 15 and close to the gasket 14 four smaller holes 17 distributed across the width of the plate. Vertically below each of the holes 17 on the opposite side of the gasket 14 there is a further small through hole 18. Finally, close to the large opening 16 but below the gasket 14 there are two small through holes 19.

Each heat transferring plate in its lower corner has two through holes 20 and 21, which on the plate side shown in FIG. 2 are surrounded by two annular gaskets 22 and 23, respectively. The holes 20 and 21 in the heat transferring plates form two channels through the plate package, which communicate with the outlets 12 of the plate heat exchanger for liquid having been condensed but which are closed by the gaskets 22 and 23, respectively, from connection with the plate interspaces in which these gaskets are arranged.

FIG. 3 shows one side of a heat transferring plate 4 which is intended to be placed behind a heat transferring plate according to FIG. 2. As can be seen, even the plate in FIG. 3 has in its upper part a relatively large opening 16 and substantially smaller holes 17, 18 and 19. Also, the plate in FIG. 3 has through holes 20 and 21 at its lower corners. In these respects the plates in FIG. 2 and FIG. 3 are thus alike. The plate according to FIG. 3, however, has a different arrangement of gaskets than the plate according to FIG. 2.

In the upper part of the plate in FIG. 3 the opening 16 and the two small holes 19 are surrounded by a first gasket 24. Furthermore, there are in the upper part of the plate four horizontally spaced gaskets 25. Each of these surrounds a small area of the plate, in which there are both one hole 17 and one hole 18.

In the lower part of the plate in FIG. 3 a gasket 26 extends along the edge of the plate downwardly from the level of the partition 5 at one long side of the plate, then along the lower short side of the plate and again upwardly along the other long side of the plate to the level of the partition 5. As can be seen, the gasket 26 extends at the level of the partition 5 horizontally up to the respective portions of the partition 5. The holes 20 and 21 at the lower corners of the plate are placed inside, i.e. above, the gasket 26.

FIG. 4 shows a section through the upper parts of a number of heat transferring plates, which section is taken along the line IV—IV in FIG. 2 and along a corresponding line IV—IV in FIG. 3.

In every second plate interspace there is shown in FIG. 4 a section through the upper part of a gasket 13 (FIG. 2) and a section through a gasket 14 (FIG. 2). Between the gaskets 13 and 14 there is formed in each such plate interspace a distribution chamber 27 which extends across the whole width of the heat transferring plates 4. The distribution chamber 27 communicates with the channel through the plate package, which is formed by the openings 16 in the plates.

Below the gasket 14 there is formed in each of these plate interspaces an evaporation space 28 in which liquid is to be evaporated. Each evaporation space 28 is closed from connection with the upper chamber 6 in the container 1 by the vertical parts of the gasket 13 (FIG. 2) but communicates with the lower chamber 7 in the container 1 through the slots between the edges of the heat transferring plates—along the lower parts of the plate long sides as well as along the lower short sides of the plates. This is illustrated by means of arrows in FIG. 2.

In each of the rest of the plate interspaces there is shown in FIG. 4 a section through a gasket 25 (FIG. 3), which together with the two heat transferring plates against which it seals forms a transferring chamber 29. Outside the gasket 25 there is formed in the interspace between the two heat transferring plates a condensation space 30. The condensation space 30 communicates with the upper chamber 6 in the container 1 through the slots between the two heat transferring plates along the upper short sides thereof as well as along the upper parts of their long sides. This is illustrated by means of arrows in FIG. 3. Vapour in the chamber 6 thus may flow into each condensation space 30 both from the two sides of the plate package and from above through the interspaces between adjacent gaskets 25.

Each condensation space 30 is closed by the gasket 26 (FIG. 3) from connection with the lower chamber 7 in the container 1.

All of the plate interspaces forming condensation spaces 30, as well as the upper chamber 6 in the container 1, are closed by the gaskets 24 (FIG. 3) from connection with the channel through the plate package, which is formed by the openings 16 in the heat transferring plates.

As illustrated by arrows in FIG. 4, each distribution chamber 27 communicates through opposing holes 17 in two adjacent heat transferring plates with two transferring chambers 29. Through opposing holes 18 in the same heat transferring plates the two said transferring chambers 29 communicate with the evaporation space 28 that is formed between the two heat transferring plates. The holes 18 have somewhat larger throughflow area than the holes 17.

The apparatus according to FIG. 1–4 is intended to operate in the following manner.

Liquid to be evaporated is pumped in a preheated condition through the inlet pipe 11 (FIG. 1) into the channel through the package of heat transferring plates, that is formed by the openings 16 in the plates. From this channel the liquid flows further out into the different distribution chambers 27 (FIG. 4), which extend across the whole width of the heat transferring plates (see the area 15 in FIG. 2). From the distribution chambers 27 the liquid flows through the holes 17 in the plates into the various transferring chambers 29 and then through the holes 18 out into the evaporation spaces 28. Simultaneously, liquid flows into the evaporation spaces 28 directly through the holes 19 from the plate interspaces in which the gaskets 24 (FIG. 3) surround the openings 16 and the holes 19. In the evaporation spaces 28 the liquid then runs downwardly in thin layers along the heat transferring plates, covering the opposing surfaces thereof.

Simultaneously there is supplied to the upper chamber 6 in the container 1 through the inlet 8 a heat emitting vapour which flows into the condensation spaces 30 through the slots between the edges of the heat transferring plates, as illustrated in FIG. 3. The heat emitting vapour condensates in the condensation spaces 30 upon its contact with the heat transferring plates to which it thus emits heat. This heat causes evaporation of the liquid running downwardly along the opposite sides of the plates in the evaporation spaces 28. Vapour formed in the evaporation spaces 28 leaves and flows out into the lower chamber 7 of the container 1 both sidewise and downwardly, as illustrated by means of arrows in FIG. 2. The generated vapour leaves the chamber 7 through the outlet 9, whereas unevaporated liquid is collected at the bottom of the container and is discharged—continuously or intermittently—through the bottom outlet 10 (FIG. 1).

Condensate formed by the heat emitting vapour in the condensation spaces 20 runs downwardly along the heat transferring plates and leaves the condensation spaces through the two channels formed by the holes 20 and 21 in the lower parts of the heat transferring plates. These channels are closed from communication with the evaporation spaces 28 by the gaskets 22 and 23 (FIG. 2). Even uncondensed parts of the heat emitting vapour leave the condensation spaces 30 through said channels and is discharged together with the condensate through the outlets 12 (FIG. 1).

As mentioned previously, the holes 18 are somewhat larger than the holes 17. The hole sizes are chosen such that during the operation of the apparatus a partial evaporation of evaporation liquid is obtained when the liquid passes through the holes 17. The holes 18 are made large enough so that the vapour pressure that will prevail in the transferring chambers 29 shall not exceed the vapour pressure prevailing in the heat emitting vapour in the condensation spaces 30. The purpose thereof is to guarantee that upon possible leakage past the gaskets 25 such leakage shall be directed into the transferring chambers 29 and not out of these chambers. Particularly if the apparatus according to the invention is used for the production of fresh water from for instance sea water, it is better if vapour flows into the sea water than if sea water flows into the fresh water.

In the embodiment of the heat transferring plates 4 shown in FIGS. 2 and 3 each plate has holes 17–19 on both sides (both to the left and to the right) of the opening 16. If desired, the holes 17–19 may be excluded in every second plate on one side of the opening 16 and in the rest of the plates on the other side of their openings 16. Alternatively, the holes 17 may be excluded in every second plate on one side of the opening 16, and the holes 18 and 19 may be excluded on the other side of the opening 16, whereas in each of the rest of the plates the holes 17 may be excluded on said other side and the holes 18 and 19 be excluded on said one side of the opening 16. Even in these cases liquid will be distributed across the whole width of the plates in each of the evaporation spaces 28.

It has been assumed above that the sealing members arranged between the heat transferring plates are constituted by elastic rubber or plastic gaskets of the kind usually used in connection with heat transferring plates of thin pressed metal sheet. Of course, any other suitable kinds of sealing members may be used. As sealing means could also be chosen permanent interconnection of the heat transferring plates along the lines which in FIGS. 2 and 3 show how different gaskets are extending. The heat transferring plates may be pressed in a way such that they abut against each other along these lines in the respective plate interspaces, so that sealing between—possibly interconnection of—the plates is facilitated.

Thanks to the design of the above described apparatus the smallest possible pressure drop is obtained for the working vapours at their entering into and discharge from, respectively, the plate heat exchanger. This makes the apparatus effective and inexpensive in operation.

FIG. 5 shows a flow diagram of a plant in which the described apparatus is included. The plant is intended for the production of fresh water from sea water. Thus, FIG. 5 shows the container 1 with its inlet 8 for heat emitting vapour, its inlet 11 for liquid to be evaporated, i.e. sea water, its outlet 9 for generated vapour, its outlet 10 for concentrated liquid, i.e. sea water having not been evaporated, so called brine, and its outlet 12 for condensate, i.e. fresh water, and uncondensed parts of the heat emitting vapour.

Sea water is pumped by means of a pump 31 into the plant. After the pump 31 the sea water is divided at 32 in two branch flows. One passes through a heat exchanger 33 and the other through a heat exchanger 34. The branch flows are then united at 35 and are pumped furtheron through another heat exchanger 36 to the inlet 11 of the container 1. The generated vapour leaving the container through the outlet 9 is transferred through a compressor 37 to the inlet 8 for heat emitting vapour. A conventional high pressure fan may serve as a compressor.

So called brine, i.e. sea water having not been evaporated in the container 1, is pumped by means of a pump 38 out of the container 1 through its bottom outlet 10 and is divided at 39 in two branch flows. One branch flow is returned to the container inlet 11 for liquid to be evaporated, whereas the other branch flow is pumped by means of a pump 40 through the heat exchanger 33 and out of the plant. In the heat exchanger 33 this branch flow emits part of its heat to one of the branch flows of incoming sea water.

A mixture of fresh water, i.e. condensate from the heat emitting vapour supplied through the inlet 8, and non-condensed residuals of this vapour are removed from the container 1 through the outlet 12. In a separator 41 the gaseous parts of the mixture are separated, and by means of a vacuum pump 42 they are sucked through the heat exchanger 36 and out of the plant. In the heat exchanger 36 they emit part of their heat to the already partly preheated incoming sea water.

The fresh water is pumped from the separator 41 by means of a pump 42 through the heat exchanger 34 and out of the plant. In the heat exchanger 34 the fresh water emits part of its heat to a branch flow of the incoming sea water.

In the described plant the incoming sea water preferably is preheated almost to a temperature corresponding to its boiling point at the evaporation pressure to be prevailing in the evaporation spaces of the plate heat exchanger. For instance, the sea water may be preheated so that it has a temperature of 55° C. in the container inlet 11. The generated vapour in the container outlet 9 may have a temperature only insignificantly exceeding 55° C. and a pressure of for instance 0,15 bars. The vapour may after that be compressed to having in the container inlet 8 and in the chamber 6 a pressure of about 0,19 bars and a temperature of about 59° C.

We claim:

1. Plate evaporator comprising a package of substantially vertically arranged heat transferring plates (4) with plate interspaces, every second one of which forms an evaporation space (28) for at least partial evaporation of a liquid and the other plate interspaces forming condensation spaces (30) for at least partial condensation of a heat emitting vapour, and further comprising first sealing means (13, 14) which in an upper part of the plate interspaces forming evaporation spaces (28) delimit distribution chambers (27), each of which has several separate connections with at least one evaporation space (28), the heat transferring plates (4) having through openings (16) forming an inlet channel for evaporation liquid, which extends through the plate package and communicates with the distribution chambers (27), wherein at least two second sealing means (25) are arranged in an upper part of each condensation space (30), horizontally spaced from each other along the heat transferring plates (4), each of said second sealing means delimiting between the heat transferring plates (4) a transferring chamber (29) that is closed from connection with other parts of the condensation space (30), the condensation spaces (30) communicate with the surrounding of the plate package through the gaps formed between said second sealing means (25) for receiving heat emitting vapour from above, and the heat transferring plates (4) have through holes (17, 18) communicating with the transferring chambers, for each transferring chamber (29) at least one first hole (17) connecting the transferring chamber (29) with a distribution chamber (27) and at least one second hole (18) connecting the transferring chamber (29) with an evaporation space (28).

2. Plate evaporator according to claim 1, wherein at least every second heat transferring plate (4) has said through holes (17, 18) arranged in pairs, said first hole (17) in a pair of holes connecting a transferring chamber (29) with a distribution chamber (27) and said second hole (18) connecting the same transferring chamber (29) with an evaporation space (28).

3. Plate evaporator according to claim 1, wherein each heat transferring plate (4) has vertical and horizontal edge portions, each of the distribution chambers (27) extends horizontally between the vertical edge portions of the heat transferring plates and the inlet channel for evaporation liquid extends through the plate package substantially in the middle between said edge portions.

4. Plate evaporator according to claim 1, wherein each heat transferring plate (4) has vertical and horizontal edge portions, and the condensation spaces (30) communicate directly with the surrounding of the plate package along the vertical as well as the upper horizontal edges of the heat transferring plates.

5. Plate evaporator according to claim 1, wherein said first hole (17) is smaller than said second hole (18).

* * * * *